United States Patent [19]

Rosenberg et al.

[11] 3,965,755

[45] June 29, 1976

[54] CONTROL DEVICE HAVING LOCKING SELECTOR MEANS

[75] Inventors: David M. Rosenberg; Henry F. Hild; John W. Stearley, all of Indiana, Pa.

[73] Assignee: Robertshaw Controls Company, Richmond, Va.

[22] Filed: Nov. 25, 1974

[21] Appl. No.: 526,975

[52] U.S. Cl. .............................. 74/10 R; 200/11 G; 200/6 BB; 74/527

[51] Int. Cl.$^2$ .......................................... F16H 35/18

[58] Field of Search ............ 74/10 R, 527; 403/355, 403/379, 261; 200/6 B, 6 BB, 17, 38 B, 11 G

[56] References Cited

UNITED STATES PATENTS

| | | | |
|---|---|---|---|
| 2,317,967 | 4/1943 | Tuttle | 200/6 BB |
| 3,121,143 | 2/1964 | Landry et al. | 200/11 G |
| 3,166,714 | 1/1965 | Hien | 74/10 |
| 3,371,170 | 2/1968 | Thomas et al | 200/38 B |
| 3,534,621 | 10/1970 | D'Ascendzo, Jr. | 74/527 |

*Primary Examiner*—Samuel Scott
*Assistant Examiner*—Randall Heald
*Attorney, Agent, or Firm*—Candor, Candor & Tassone

[57] ABSTRACT

A control device having a housing provided with a movable actuator and a rotatable selector shaft for positioning the actuator in relation to the rotational position of the shaft. An actuator driver is carried by the shaft and is operatively interconnected to the actuator to drive the same upon rotation of the driver by the shaft, the shaft and driver being axially movable relative to the actuator. The housing has a latching part cooperable with a latching part of the shaft when the shaft is in a certain rotational and axial position relative to the housing whereby the shaft cannot be rotated relative to the housing until the shaft is axially moved from that certain axial position thereof to another axial position thereof to clear the latching part of the shaft from the latching part of the housing and thereby unlock the selector shaft.

6 Claims, 6 Drawing Figures

CONTROL DEVICE HAVING LOCKING SELECTOR MEANS

This invention relates to an improved selector means of a control device.

It is well known that various control devices have each been provided with a rotatable selector shaft for turning on and off the control device or for selectively determining the operating condition of the control device or the like.

It is a feature of the invention of copending patent application, Ser. No. 488,303, filed July15,1974 to provide an improved means for locking a selector shaft of such a control device in its "off" position and thereby requiring unlocking of such selector shaft before the same can be turned to an "on" position thereof whereby a safety feature is provided by that invention in that the same prevents the control device from being accidentally turned to an "on" condition thereof.

In particular, that invention provides a control device having a housing provided with a movable actuator and a rotatable selector shaft for positioning the actuator in relation to the rotational position of the shaft. An actuator driver is carried by the shaft and is operatively interconnected to the actuator to drive the same upon rotation of the driver by the shaft, the shaft and driver being axially movable relative to the actuator. The housing has a latching means and the driver has a latching means cooperable with the latching means of the housing when the shaft is in a certain rotational and axial position relative to the housing whereby the shaft cannot be rotated relative to the housing until the shaft is axially moved from that certain axial position thereof to another axial position thereof to clear the latching means of the driver from the latching means of the housing and thereby unlock the selector shaft. The certain axial and rotational position of the selector shaft can be the "off" position of the selector shaft and the actuator can comprise a cam for operating an electrical switch disposed in the housing of the control device.

However, it has been found according to the teachings of this invention that the shaft can be provided with a latching means remote from the driver thereof to cooperate with a latching means on the housing for the purposes previously set forth.

In particular, the front cover of the control device of this invention can be provided with a mounting plate that has a recess therein to receive a latching pin carried by the selector shaft when such shaft is in a certain rotational and axial position relative to housing to latch the selector shaft in such position until the shaft is axially moved from that certain axial position thereof to another axial position thereof to clear the latching means of the shaft from the latching means of the housing and thereby unlock the selector shaft.

Accordingly, it is an object of this invention to provide an improved control device having one or more of the novel features set forth above or hereinafter shown or described.

Other objects, uses and advantages of this invention are apparent from a reading of this description which proceeds with reference to the accompanying drawings forming a part thereof and wherein.

While the various features of this invention are hereinafter illustrated and described as being particularly adaptable to provide a control device having an electrical switch means therein, it is to be understood that the various features of this invention can be utilized singly or in any combination thereof to provide selector means for other types of control devices as desired.

Therefore, this invention is not to be limited to only the embodiments illustrated in te drawings, because the drawings are merely utilized to illustrate one of the wide variety of uses of this invention.

Figure 1:
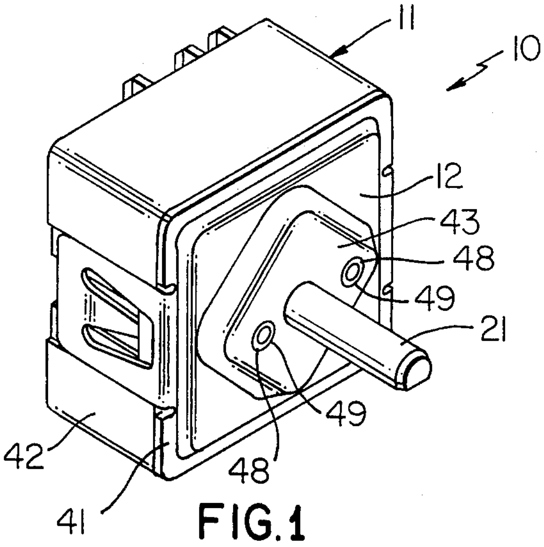
FIG. 1 is a perspective view of the improved control device of this invention.
Figure 2:
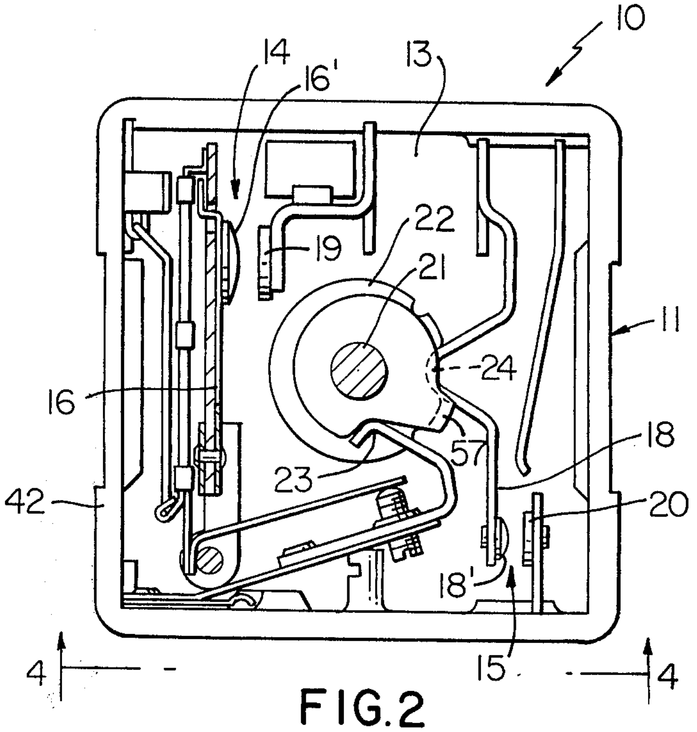
FIG. 2 is an enlarged front view of the control device of FIG. 1 with the cover member removed and with the control device in the "off" position thereof.
Figure 3:
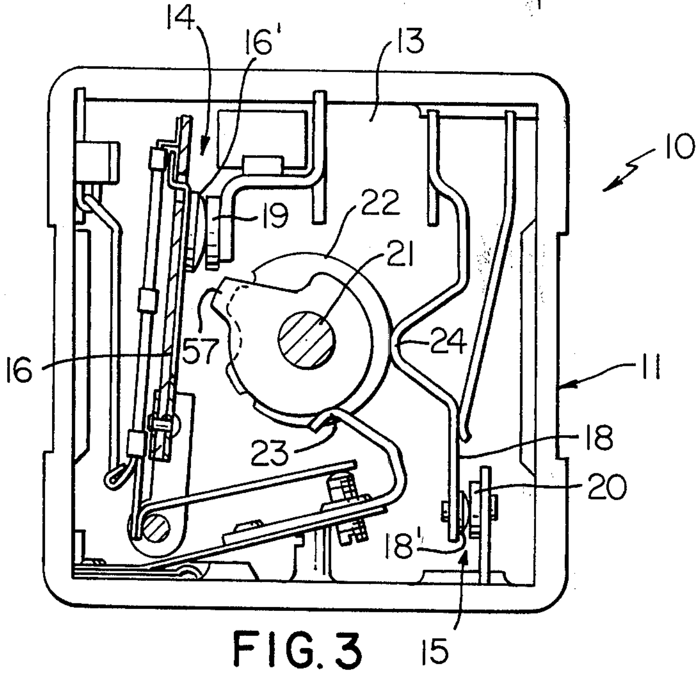
FIG. 3 is a view similar to FIG. 2 and illustrates the control device in an "on" condition thereof.
Figure 4:
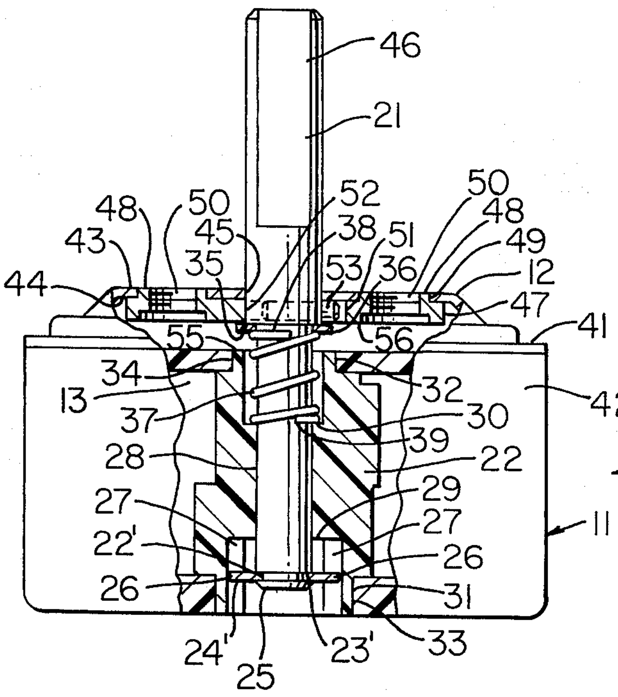
FIG. 4 is a side view of the control device of FIG. 1 and is taken substantially in the direction of the arrows 4—4 of FIG. 2 with a part of the control device being broken away.

Referring now to FIGS. 1, 2 and 3, the improved control device of this invention is generally indicated by the reference numeral 10 and comprises a housing means 11 provided with a front cover 12 and defining a chamber 13 therein, the control device 10 having one or more electrical switches 14 and 15 disposed in chamber 13 and respectively comprising movable switch blades 16 and 18 normally having their respective contacts 16' and 18' held out of contact with fixed contacts 19 and 20 when a selector shaft 21 of the control device 10 is disposed in the "off" position illustrated in FIGS. 2 and 4.

Figure 5:
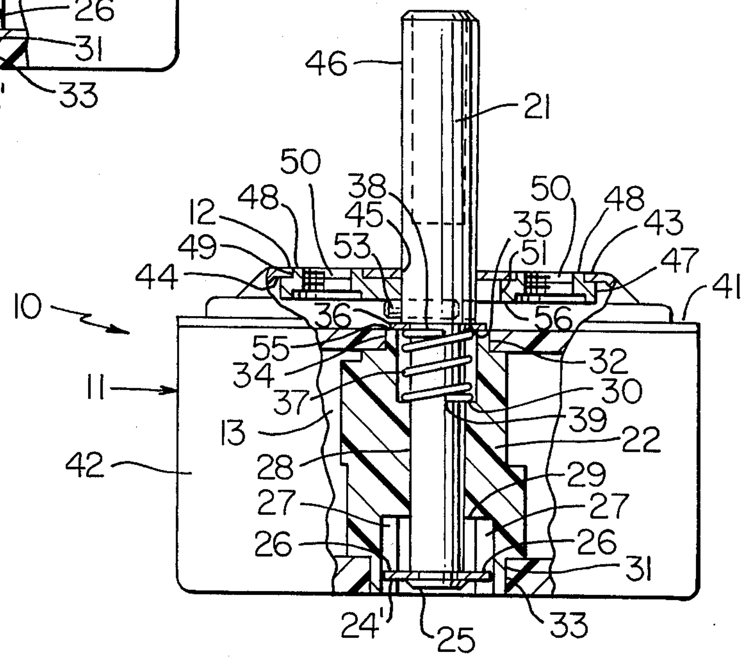
FIG. 5 is a view similar to FIG. 4 and illustrates the control device in an "on" condition thereof.

However, the selector shaft 21 is operatively interconnected to an actuator cam 22 in a manner hereinafter described so that when the shaft 21 is turned to an "on" position thereof as illustrated in FIGS. 3 and 5, the actuator cam 22 as been rotated relative to the housing 11 so that appropriate cam surfaces thereof operate on cam follower portions 23 and 24 of the respective switch blades 16 and 18 to move their respective contacts 16' and 18' into contact with the fixed contacts 19 and 20 as illustrated in FIG. 3 for any desired control purpose.

As previously stated, one of the features of this invention is to provide a safety locking means for the selector shaft 21 so that when the same is disposed in the "off" position of FIGS. 2 and 4, the shaft 21 cannot be accidentally rotated from that "off" position to the "on" position of FIGS. 3 and 5 unless the control shaft 21 is unlocked from its "off" position as will be apparent hereinafter.

Figure 6:
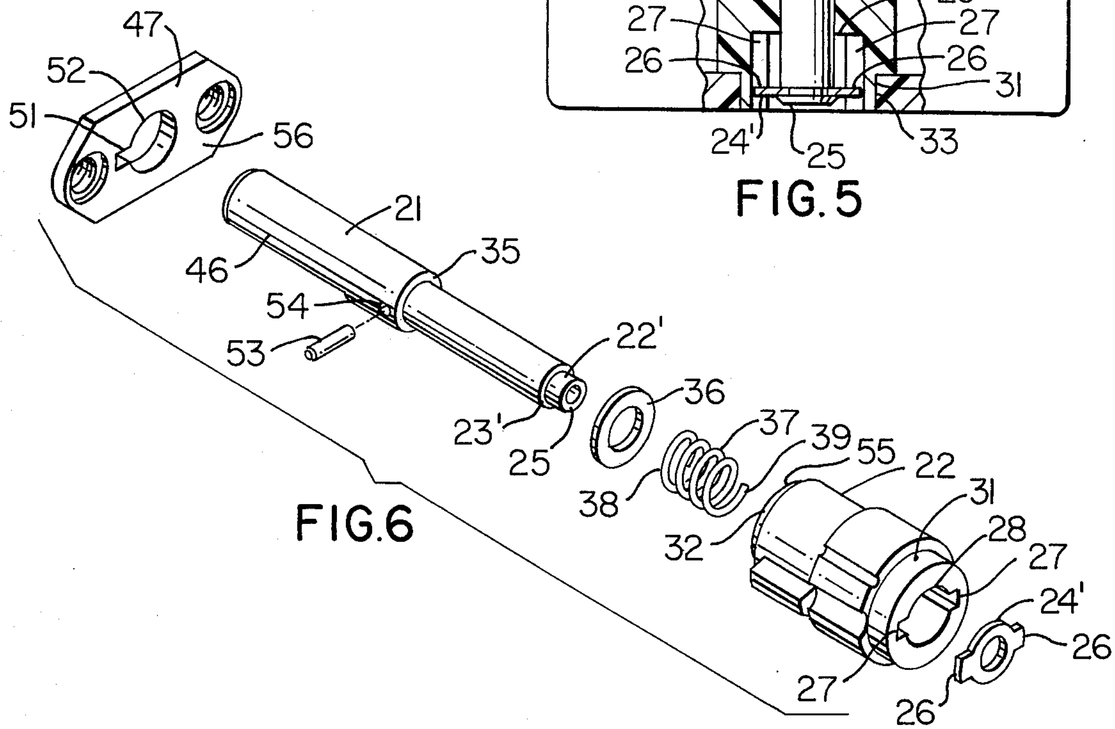
FIG. 6 is an exploded perspective view of certain parts of the selector means of the control device of FIG. 1.

As best illustrated in FIGS. 4–6, the control shaft 21 has a reduced end 22' thereof defining an annular shoulder 23' against which a washer-like actuator driver 24' abuts and is held thereagainst by a subsequent turning over of the end surface 25 of the shaft 21 as illustrated in FIGS. 4 and 5 whereby the driver 24' is fixed to the shaft 21 to rotate in unison therewith. The driver 24' has a pair of outwardly directed, diametrically opposed driving tangs 26 for respectively being received in slots 27 formed in the actuator cam 22 and intersecting with a stepped bore 28 passing axially therethrough. In this manner, the driver 24' and shaft 21 can be moved axially relative to the actuator cam 22 from the "off" position illustrated in FIG. 4 to an "on" positon thereof as illustrated in FIG. 5 while rotational movement of the selector shaft 21 will cause the driver tangs 26 to cause like rotational movement of the actuator cam 22 when the shaft 21 is in the unlocked condition of FIG. 5 as will be apparent hereinafter.

The stepped bore 28 passing through the actuator cam 22 defines internal shoulders 29 and 30 in the actuator cam 22.

The actuator cam 22 has a pair of bearing end surfaces 31 and 32 respectively disposed in bearing openings 33 and 34 of the housing 11 to rotatably mount the cam actuator 22 to the housing means 11 in the chamber 13 thereof with the selector shaft 21 being rotatably mounted to the cam actuator 22 in the reduced portion of the bore 28 thereof that is intermediate the shoulders 29 and 30 thereof.

The shaft 21 has another annular shoulder 35 axially spaced from the annular shoulder 23' thereof as well as from the annular shoulder 30 of the cam actuator 22 when the selector shaft 21 is assembled thereto in the manner illustrated in FIGS. 4 and 5. In this manner, a washer member 36 can be telescoped on the shaft 21 to abut against the shoulder 35 under the force of a compression spring 37 also telescoped on the shaft 21 and having one end 38 bearing against the washer member 36 and the other end 39 thereof bearing against the annular shoulder 30 of the cam actuator 22 whereby the force of the compression spring 37 continuously acts on the washer 36 and, thus, on the shoulder 35 of the shaft 21 to tend to urge the same outwardly relative to the housing 11 for a purpose hereinafter described.

The housing 11 includes a front plate or front cover 12 that is substantially cup-shaped and has an outer peripheral portion 41 for engaging a cup-shaped part 42 of the housing means 11 and close the chamber 13 thereof, the front cover 12 having an outside surface 43 and an inside surface 44 and being provided with a central opening 45 through which the selector shaft 21 can project to have a suitable control knob or other selector means (not shown) fastened on the outer end 46 thereof for causing rotational and axial movement of the shaft 21 in the manner hereinafter described.

A mounting plate 47 is secured to the inside surface 44 of the front cover 12 in any suitable manner, such as by spot welding or the like, and has a pair of mounting extensions 48 thereon adapted to project into openings 49 formed through the front cover 12, the extensions 48 each having a threaded bore 50 passing therethrough whereby the control device 10 can be mounted to any suitable structure by threaded fastening members passing into the threaded bores 50 thereof.

The mounting plate 47 also has a recess 51 formed therein that intersects with a circular and central opening 52 passing therethrough whereby the shaft 21 is adapted to pass through the opening 52 of the mounting plate 47 as the opening 52 thereof is coaxially aligned with the opening 45 of the front cover 12.

A latching pin 53 is disposed and secured in a transverse bore 54 of the shaft 21, such as by press-fitting, so that a portion thereof projects substantially transversely out of the shaft 21 in a manner adapted to be received in the recess 51 of the mounting plate 47 to latch the shaft 21 in the axial and rotational position illustrated in FIG. 4 since the shaft 21 cannot be rotated in that axial position of FIG. 4 through the interlocking relation of the pin 53 in the recess 51 of the mounting plate 47.

Thus, it can be seen that the control device 10 of this invention can be formed of a relatively few simple parts to operate in a manner now to be described.

When the selector shaft 21 is disposed in the "off" position as illustrated in FIGS. 2 and 4, the latching pin 53 of the shaft 21 is fully disposed in the recess 51 of the mounting plate 47 whereby the control shaft 21 is in a certain rotational and axial position relative to the housing means 11 so that the same cannot be rotated in that axial position thereof. In this "off" position of the control shaft 21, it can readily be seen in FIG. 2 that the cam actuator 22 is maintaining the switches 14 and 15 in an open condition thereof.

Therefore, a person cannot accidentally rotate the shaft 21 by bumping the same or the conventional control knob disposed thereon to turn the control device 10 "on" and thereby cause an accidental closing of the switches 14 and 15 thereof because in order for a person to turn the control device 10 to an "on" position, the person must grasp the shaft 21 and axially move the same in toward the housing 11 in opposition to the force of the compression spring 37 until the pin 53 of the shaft 21 clears the recess 51 of the mounting plate 47 to permit the shaft 21 to be rotated relative to the housing means 11.

If desired, the control shaft 21 can be pushed inwardly into the housing 21 until the washer-like member 36 bottoms out against the end surface 55 of the actuator cam 22 in the manner illustrated in FIG. 5 whereby further inward axial movement of the shaft 21 is prevented.

In this manner, the operator now knows that when the shaft 21 has bottomed out against the end 55 of the actuator cam 22, he is free to turn the shaft 21 to the desired "on" position thereof to cause closing of the switches 14 and 15 in the manner illustrated in FIG. 3. Such rotational movement of the shaft 21 is accomplished even though the shaft 21 is no longer held in the "on" positon illustrated in FIG. 5 once the pin 53 has cleared the locking recess 51 and the shaft 21 has been rotated beyond a position for the pin 53 to be received in the recess 51 whereby the force of the compression spring 37 will only move the shaft 21 until its pin 53 is disposed against the inside surface 56 of the mounting plate 47 which will act as a bearing surface for the pin 53 permitting the same to slide thereon as the shaft 21 is rotated to the desired "on" position thereof.

Thereafter, when the operator desires to turn off the control device 10, the shaft 21 is merely rotated to the "off" position thereof whereby the force of the compression spring 37 will drive the shaft 21 and its locking pin 53 upwardly in FIG. 4 to enter the recess 51 of the mounting plate 47 and again lock the shaft 21 in the "off" position thereof as illustrated in FIG. 4, the splined connection between the actuator driver 24' and the actuator cam 22 permitting such axial movement of the shaft 21 relative thereto as previously described.

If desired, the actuator cam 22 can be provided with a stop portion 57 as illustrated in FIGS. 2 and 3 to limit the rotational movement of the shaft 21 in the "on" direction thereof as well as in the "off" direction thereof.

Therefore, it can be seen that this invention provides an improved selector means for control device or the like.

While the form of this invention now preferred has been described and illustrated as required by the Patent Statute, it is to be understood that other forms can be utilized and still come within the scope of the appended claims.

What is claimed is:

1. In a control device having a housing provided with a movable actuator and a rotatable selector shaft for positioning said actuator in relation to the rotational position of said shaft, the improvement comprising an actuator driver carried by said shaft and being operatively interconnected to said actuator to drive the same upon rotation of said driver by said shaft, said shaft and driver being axially movable relative to said actuator, said housing having a latching means, said shaft having a latching means remote from said drive and cooperable with said latching means of said housing when said shaft is in a certain rotational and axial position relative to said housing whereby said shaft cannot be rotated relative to said housing until said shaft is axially moved from said certain axial position to another axial position to clear said latching means of said shaft from said latching means of said housing, said latching means of said housing comprising part of a front cover of said housing, said part of said front cover comprising a plate carried by said front cover.

2. In a control device as set forth in claim 1, said plate having a recess therein, said shaft having an extension receiveable in said recess to latch said shaft when said shaft is in said certain rotational and axial position thereof relative to said housing.

3. In a control device as set forth in claim 2, said plate having an opening therethrough and telescopically receiving said shaft therethrough, said recess of said plate intersecting with said opening thereof.

4. In a control device as set forth in claim 3, said extension of said shaft comprising a pin carried by said shaft and projecting substantially transversely thereof.

5. In a control device as set forth in claim 3, said front cover of said housing having an outside surface and an opposed inside surface, said plate being carried by said inside surface of said front cover.

6. In a control device as set forth in claim 5, said front cover having a plurality of openings passing therethrough, said plate having a plurality of mounting projections thereof extending respectively into said plurality of openings, each mounting projection having a threaded bore therein for control device mounting purposes.

* * * * *